L. S. KEELER & J. F. BRIGHTMAN.
GATE VALVE.
APPLICATION FILED MAY 18, 1914.

1,294,112.

Patented Feb. 11, 1919.

Witnesses:

Lloyd S. Keeler
Joseph F. Brightman Inventors

By Attorney
Parsons Hall Bodell

UNITED STATES PATENT OFFICE.

LLOYD S. KEELER AND JOSEPH F. BRIGHTMAN, OF SYRACUSE, NEW YORK, ASSIGNORS TO THE SYRACUSE FAUCET AND VALVE COMPANY, OF SYRACUSE, NEW YORK, A CORPORATION OF NEW YORK.

GATE-VALVE.

1,294,112. Specification of Letters Patent. Patented Feb. 11, 1919.

Application filed May 18, 1914. Serial No. 839,293.

*To all whom it may concern:*

Be it known that we, LLOYD S. KEELER and JOSEPH F. BRIGHTMAN, citizens of the United States, and residents of Syracuse, in the county of Onondaga and State of New York, have invented a certain new and useful Gate-Valve, of which the following is a specification.

This invention relates to valves and has for its object a particularly simple and efficient valve construction especially applicable for gate valves, in which the packing of the stem is relieved of the endwise thrust incident to the opening and closing the gate; and it consists in the novel combinations and constructions hereinafter set forth and claimed.

In describing this invention, reference is had to the accompanying drawings, in which like characters designate corresponding parts in all the views.

Figure 1:
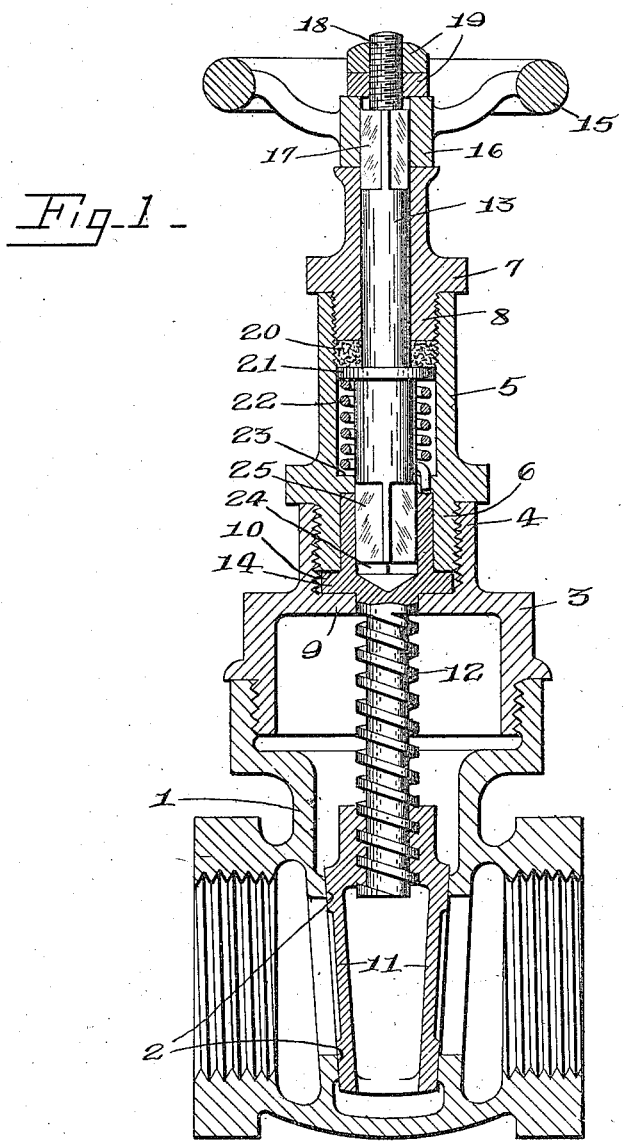
Figure 1 is a longitudinal sectional view of this gate valve.
Figure 2:
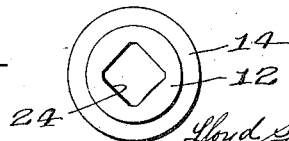
Fig. 2 is an end view looking downwardly on the inner section of the stem.

This valve comprises, generally, a casing, a valve head, or gate, a stem for operating the gate including inner and outer sections, the inner section having screw threaded connection with the gate and the outer section having sliding connection with the inner section, and means for holding the inner section from endwise movement and taking the end thrust thereof whereby the outer section, and the packing associated therewith is relieved of the end thrust.

The casing includes a body, a bonnet mounted on the body, a neck mounted on the bonnet, and a cap piece at the upper end of the neck.

1 is the body which is formed with valve seats 2. 3 is the bonnet having screw threaded connection with the body 1 and having an upwardly extending nipple 4. 5 is the sleeve having a cupped portion 6 at its lower end which has screw threaded connection with the nipple 4 and preferably extends into the nipple 4.

7 is the cap piece for closing the upper end of the neck 5, said piece 7 having a plug 8 threading into the upper end of the neck 5. The bonnet 3 is formed with an internal annual flange 9 opposed to the lower end face 10 of the neck.

11 is the gate movable into and out of engagement with the valve seats 2; and 12 and 13 are the inner and outer sections of the rotatable stem for raising and lowering the gate 11. The inner section 12 extends through the bonnet 3 and is provided with screw threads which turn into a threaded passage in the gate 11. The upper end of the section 12 extends into the lower end of the cupped portion 6 of the neck 5 and is provided with an annular flange 14 located between the flange 9 of the bonnet and the face 10 at the lower end of the cupped portions 6 of the neck. The flange 14 and the flange 9 and face 10 constitute means preventing axial movement of the inner section 11 and taking the end thrust thereof and relieving the outer section 13 and its packing from the end thrust.

The outer section 13 of the stem extends upwardly through the neck 5 and cap piece 7 and is provided with a handle 15 at its upper end, the handle having a hub 16 bearing on the upper end of the cap piece 7, and the upper end of the section 13 being squared at 17 and slidably fitting a squared passage of the hub 16. The section 13 terminates at its upper end in a threaded spindle 18 on which turns nuts 19 against the upper face of the hub 16. The section 13 thus is free to have a limited movement upwardly relatively to the handle.

The packing associated with the section 13 includes a ring 20 interposed between the lower end face of the plug 8 and the annular flange 21 of the section 13, and the flange is held against the packing and any wear taken up, by a spring 22 located within the neck 5 and encircling the section 13 and pressing upwardly on the flange 21, and abutting at its lower end against the internal annular flange 23 in the neck 5, the flange 23 overlying the upper end of the section 11.

The sections 12 and 13 are connected by a sliding connection here shown consisting of a square socket 24 formed in the upper end of the section 12 and the squared lower end 25 of the section 13 slidably fitting said socket.

During rotation of the stem to raise or lower the gate, the end thrust incidental to operating the gate is taken by the flange 14 and the bonnet 3 and neck 5, while the spring 22 and the packing ring 20 is relieved of end thrust.

What we claim is:

1. In a gate valve, a casing comprising a body, a bonnet mounted on the body, an upwardly extending neck mounted on the bonnet, a cap closing at the upper end of the neck, the lower end of the neck having a cupped portion threading into the upper end of the bonnet and the bonnet having an internal flange opposed to, and spaced apart from, the lower end of said cupped portion, a gate movable in the body, a stem for operating the gate including inner and outer sections, the inner section having threaded connection with the gate, the upper portion thereof extending into the cupped portion at the lower end of the neck and being provided with an annular flange extending between the internal flange of the bonnet and the lower end of said cupped portion, the outer section extending upwardly through the neck, and the cap at the upper end of the neck and having a handle at its outer end, the outer section being formed with an annular flange opposed to the inner end of the cap, a packing ring interposed between the cap and the last named flange, and a spring located below the same within the neck and acting to press upwardly on the last named flange, substantially as and for the purpose described.

2. In a gate valve, a casing including an upwardly extending neck, a gate in the casing, means for opening and closing the gate including a stem comprising inner and outer sections, the outer section being located in the neck and connected to the inner section by a sliding connection, and the inner section being connected to the gate to raise and lower the same during rotation of said sections, the neck being formed with an internal shoulder around the outer section of the stem, and said sections being connected by a sliding connection, and the upper end of the inner section abutting against the lower side of said shoulder, and a spring encircling the outer section and pressing upwardly thereon and being seated at its lower end against the upper face of said shoulder, substantially as and for the purpose specified.

3. In a gate valve, a casing including a body, a bonnet mounted on the body, a neck mounted on the bonnet and a cap piece at the upper end of the neck, a gate movable in the body, a stem for opening and closing the gate including inner and outer sections, the inner section extending through the bonnet and having a head at its upper end, the head being formed with non-circular socket, the outer section extending upwardly through the neck and the cap piece, a packing ring inserted between said internal shoulder and the cap piece, the neck being also formed with an internal shoulder located below the shoulder on the outer section of the stem, and a spring encircling the outer section of the stem and being located between said shoulders, the bonnet being formed with an internal annular flange engaging the lower end of the head of the inner stem section, the upper end of said head engaging the internal shoulder of the neck, substantially as and for the purpose set forth.

In testimony whereof, we have hereunto signed our names, in the presence of two attesting witnesses, at Syracuse, in the county of Onondaga, in the State of New York, this 25th day of April, 1914.

LLOYD S. KEELER,
JOS. F. BRIGHTMAN.

Witnesses:
GEO. F. RANSOM,
FRANK E. REID.

Copies of this patent may be obtained for five cents each, by addressing the "Commissioner of Patents, Washington, D. C."